United States Patent
Thompson et al.

[11] Patent Number: 5,810,434
[45] Date of Patent: Sep. 22, 1998

[54] PENDULUM ARMREST COVER LOCK

[75] Inventors: Douglas R. Thompson, Hudsonville;
David J. Spykerman, Zeeland;
Thomas S. Mayr, Holland, all of Mich.

[73] Assignee: Prince Corporation, Holland, Mich.

[21] Appl. No.: 782,826

[22] Filed: Jan. 13, 1997

[51] Int. Cl.⁶ .............................. A47C 7/62; B60N 2/46
[52] U.S. Cl. .................... 297/188.19; 297/411.32
[58] Field of Search ...................... 297/117, 115,
297/112, 113, 188.01, 188.04, 188.07, 188.14,
188.15, 188.19, 188.21, 411.2, 411.3, 411.32,
411.35, 411.38

[56] References Cited

U.S. PATENT DOCUMENTS

| | | |
|---|---|---|
| 530,862 | 12/1894 | Teed . |
| 3,205,510 | 9/1965 | Levine . |
| 3,756,639 | 9/1973 | Wilkinson . |
| 4,094,392 | 6/1978 | Gregg et al. . |
| 4,579,384 | 4/1986 | Sharod . |
| 4,865,368 | 9/1989 | McCall et al. . |
| 4,890,883 | 1/1990 | Boerema et al. .............. 297/188.19 X |
| 4,906,044 | 3/1990 | Wilstermann . |
| 5,116,099 | 5/1992 | Kwasnik et al. . |
| 5,425,568 | 6/1995 | Sliney et al. . |

FOREIGN PATENT DOCUMENTS

518358A1   12/1992   European Pat. Off. .
3840837    6/1990    Germany .

*Primary Examiner*—Milton Nelson, Jr.
*Attorney, Agent, or Firm*—Price, Heneveld, Cooper, DeWitt & Litton

[57] ABSTRACT

An armrest cover locking mechanism for an armrest having a body with a storage compartment and a cover which is pivotally mounted to the armrest body for movement between a closed position for normal use of the armrest and an open position for access to items within the storage compartment. The latching system includes a latch mounted to the forward edge of the cover and extending downwardly into the storage bin and latchably engaging a spring-loaded, push-button slide which includes a latch plate which engages the latch of the cover when in a normal position. Upon depression of a push-button actuator associated with the latch slide, the latch plate clears the cover latch allowing the cover to be opened when the armrest is in a horizontal position. The slide is slidably mounted within a housing and includes a curvilinear pendulum pivotally mounted to the slide such that when the armrest is in a horizontal position, the slide can move freely within the housing. When the armrest is moved toward a vertical position, however, the pendulum remains stationary as the slide assembly pivots with a locking post on the housing engaging the pendulum to prevent movement of the spring-loaded slide once the armrest is moved from the horizontal position.

17 Claims, 2 Drawing Sheets

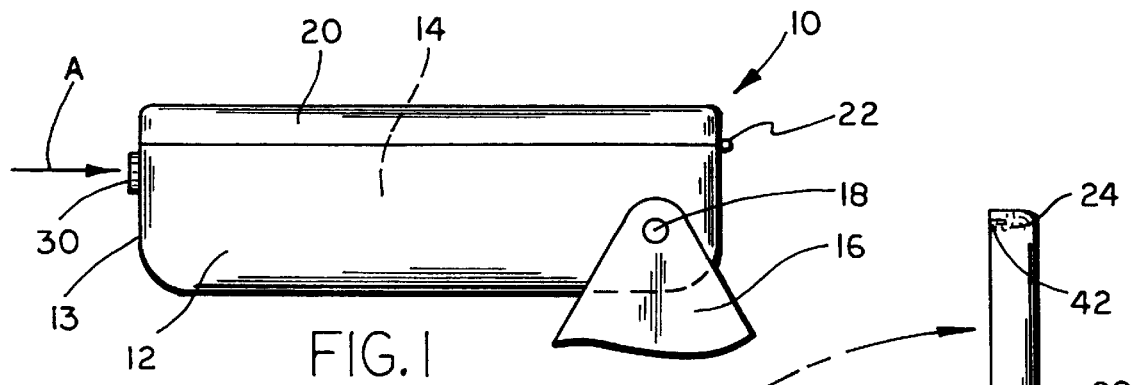
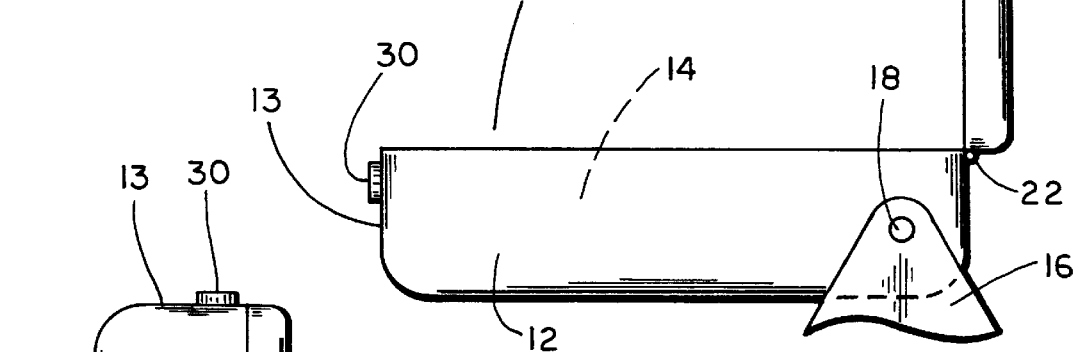
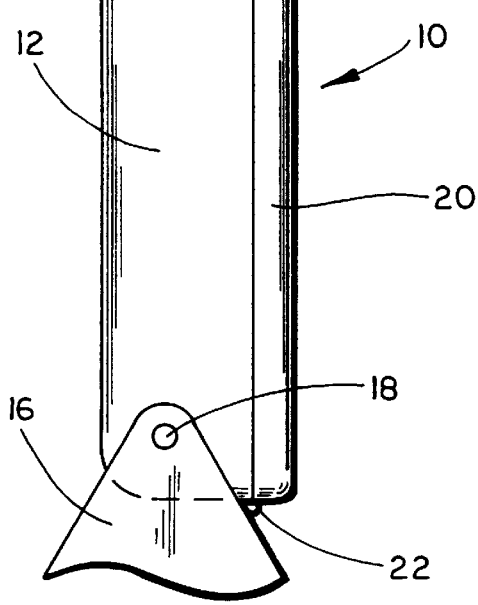

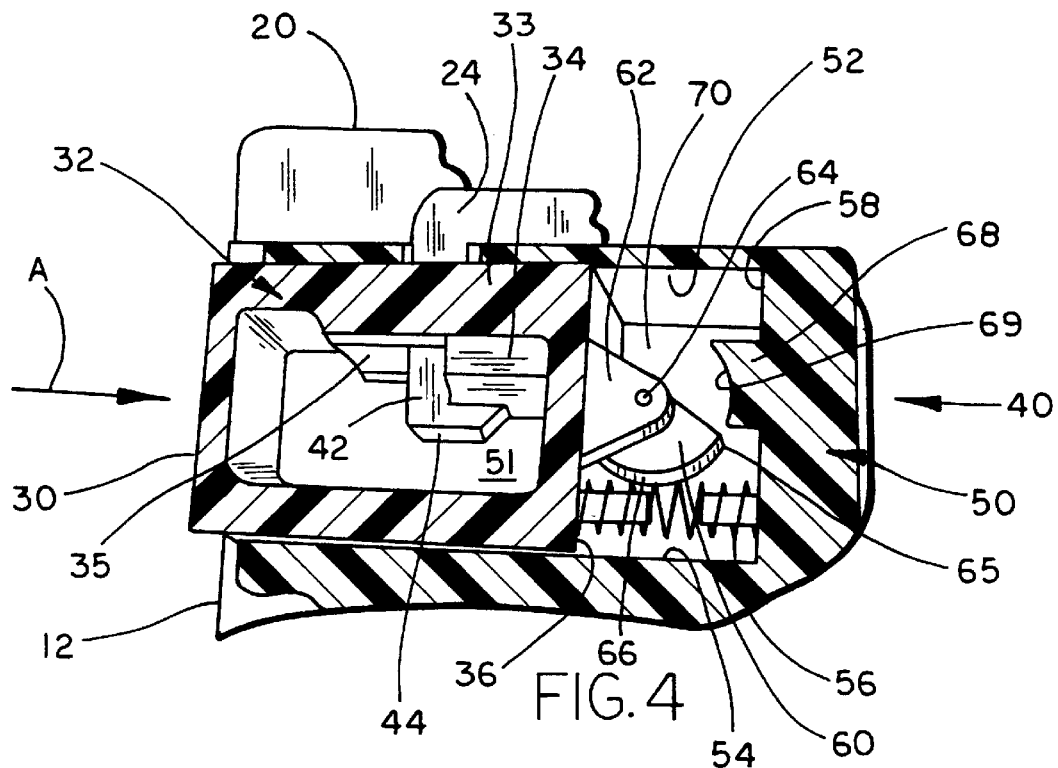
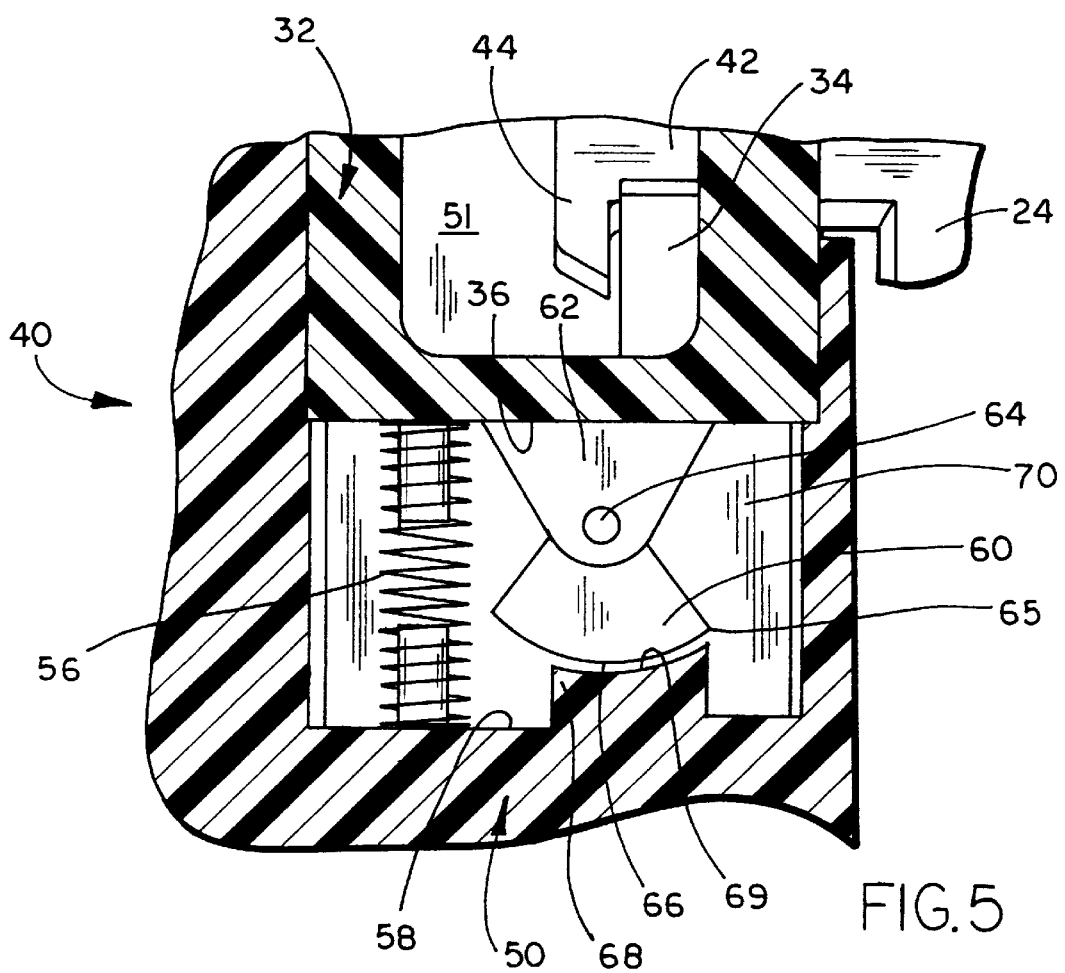

5,810,434

PENDULUM ARMREST COVER LOCK

BACKGROUND OF THE INVENTION

The present invention relates to a vehicle armrest having a storage compartment and to a latch which prevents inadvertent opening of the cover when the armrest is raised to a vertical stored position.

Storage armrests have become a popular vehicle accessory with the upper surface of the armrest forming both a resting surface for use of the armrest when in a horizontal position between the front seats and a cover for a storage compartment or bin defined by the body of the armrest itself. Typically, push-button latches are provided for access to the armrest cover, however, as can be appreciated, when the armrest is in a vertical or raised position between the vehicle seats, loose items contained in the storage bin can inadvertently be discharged from the storage bin if the latch is accidentally actuated as, for example, by reaching between the seats into the rear seat area and inadvertently depressing the typical push-button latch control.

In order to overcome this problem, a variety of mechanisms have been proposed for, in essence, locking the latch assembly against operation when the armrest is in a vertical position. U.S. Pat. Nos. 4,906,044 and 5,116,099 represent two approaches which have been employed and which utilize either a gravity actuated ball-type lock or an actuator link associated with the pivot mechanism for the armrest, respectively. Although such mechanisms provide the desired control, the ball-type assembly requires a relatively complex channel for containing a locking ball therein and, if the ball should become stuck for one reason or another as, for example, if debris enters the channel in which the ball needs to freely move, the device can become inoperative. The linkage assembly coupled with the armrest pivot mechanism is somewhat complicated and adds significant cost to the armrest.

Although pendulum assemblies have been employed in the suitcase art as, for example, represented by U.S. Pat. No. 4,094,392 to prevent inadvertent opening of a suitcase when in an inverted position, there exists a need for an armrest cover locking mechanism which is gravity operated, inexpensive and reliable under the adverse operating conditions encountered in the vehicle environment.

SUMMARY OF THE PRESENT INVENTION

The system of the present invention provides such an armrest cover locking mechanism for an armrest having a body with a storage compartment therein and a cover which is pivotally mounted to the armrest body for movement between a closed position for normal use of the armrest and an open position for access to items stored within the storage compartment. The latching system of the present invention includes a latch mounted to the forward edge of the cover and extending downwardly into the storage bin and latchably engaging a movable latch assembly mounted to the body of the armrest in sealed relationship thereto for preventing debris from interfering with the latch mechanism. The latch assembly comprises a housing for a spring-loaded, push-button slide which includes a latch plate which engages the latch of the cover when in a normal position. Upon depression of a push-button actuator associated with the latch slide, the latch plate clears the cover latch allowing the cover to be opened when the armrest is in a horizontal position. The slide is slidably mounted within a housing and includes a curvilinear pendulum pivotally mounted to the slide such that when the armrest is in a horizontal position, the slide can move freely within the housing. When the armrest is moved toward a vertical position, however, the pendulum remains stationary as the slide assembly pivots with a locking post on the housing engaging the pendulum to prevent movement of the spring-loaded slide once the armrest is moved from the horizontal position, approximately 15° to 30°.

In a preferred embodiment of the invention, the pendulum is an arcuate segment having curvilinear outer surface while the post has a correspondingly mated arcuate surface for engaging the pendulum as the armrest is raised. The pendulum arcuate surface in a preferred embodiment of the invention was approximately 90° while the arcuate surface of the post circumscribed an arc of from between 45° to 90°.

The system of the present invention, therefore, provides a gravity operated lock for a covered armrest storage compartment which can be sealed from the debris and is relatively inexpensive to manufacture and reliable under adverse conditions of the vehicle environment. These and other features, objects and advantages of the present invention will become apparent upon reading the following description thereof together with reference to the accompanying drawings.

BRIEF DESCRIPTION OF THE DRAWINGS

FIG. 1 is a left side elevational view of an armrest embodying the present invention, shown in a first use position;

FIG. 2 is a left side elevational view of the structure shown in FIG. 1, showing the cover of the armrest moved to an open position for access to the storage compartment therein;

FIG. 3 is a left side elevational view of the structure shown in FIGS. 1 and 2, with the armrest in a raised, stored position;

FIG. 4 is a vertical cross-sectional view of the latching assembly for the armrest and cover shown in the position of FIG. 1; and FIG. 5 is enlarged vertical cross-sectional view of the armrest latch assembly shown in a locked position with the armrest shown in the position of FIG. 3.

DETAILED DESCRIPTION OF THE PREFERRED EMBODIMENT

Referring initially to FIGS. 1–3, there is shown an armrest assembly 10 for a vehicle, such as an automobile. The armrest includes a body 12 having sidewalls, end walls and a floor defining a generally rectangular storage compartment 14 therein. The body of the armrest is conventionally pivotally mounted to the vehicle floor or seat by means of a mounting bracket 16 and pivot pin 18 such that the armrest can be moved from a horizontal use position, shown in FIG. 1, to a raised, stored position, shown in FIG. 3. A cover 20 is pivotally mounted to the armrest body 12 by means of a hinge assembly 22 of conventional construction at the rear edge of the armrest. A push-button actuator 30 associated with the latch mechanism of the present invention is mounted to the forward wall 13 of body 12 and can be depressed only when the armrest is in a horizontal position for opening the cover by depressing the actuator in the direction indicated by arrow A in FIG. 1, such that the cover 20 can be raised in the direction indicated by arrow B in FIG. 2. The latch assembly 40 (FIGS. 4 and 5) is contained primarily within the body 12 of the armrest assembly 10 with the cover 20 only including a generally L-shaped latch 42 (FIGS. 2 and 4–5) with the remainder of the mechanism being substantially sealed within the body of the armrest storage compartment 14.

Referring now to FIGS. 4 and 5, the push-button actuator 30 is integral with a slide 32 having a generally rectangular configuration and which is mounted within an enclosed, generally rectangular housing 50 secured to the front wall 13 of the armrest body 12. Slide 32 is made of a lubricous polymeric material, such as ABS or the like, as is the housing 50, which defines a generally rectangular guide having upper and lower surfaces 52 and 54, respectively, for slidably receiving the slide 32 for movement between an extended locking position and a position moved to the right (FIG. 4) against a bias spring 56 which extends between a rear surface 36 of the rectangular slide and the wall 58 of housing 50. The slide 32 includes a generally rectangular slot 35 through the upper leg 33 thereof through which a downwardly projecting L-shaped latch arm 42 mounted to the cover 20 extends. Arm 42 has a rearwardly projecting leg 44 engaging a latch block 34 of slide 32 when in a normally locked position, as seen in FIGS. 1 and 4. Latch arm 42 extends downwardly from a support member 24 of cover 20 and can be recessed, as shown in phantom form in FIG. 2.

The latch assembly 40 includes a pendulum 60 which is freely pivotally mounted to a mounting boss 62 extending from the rear wall 36 of slide 32 by means of a pivot pin 64. The pendulum 60 is made of a relatively heavy material such as plated steel and is freely movable with respect to mounting boss 62 such that it remains in substantially a horizontal position due to the gravitational force on the pendulum. The pendulum is shaped in the form of a quadrant of a disk having an outer arcuate surface 66 circumscribing an arc in the preferred embodiment of approximately 90°. Mounted to the rear wall 58 of housing 50 is a locking post 68 extending in horizontal alignment with pivot pin 64 and having an arcuate surface 69 circumscribing an arc of from about 45° to 90° with its lower edge clearing the corner 65 of pendulum 60, as seen in FIG. 4, when the armrest is in a horizontal position. Thus, when the armrest is in the horizontal position shown in FIG. 4, slide 32 can be moved to the right, as indicated by arrow A, with the pendulum 60 clearing post 68 allowing the latching plate 34 to clear the L-shaped latch bar 42 and the cover 20 to be pivoted on hinge 22 to an open position, as shown in FIG. 2. Upon releasing pressure on the actuator button 30, the slide moves to the forward position shown in FIG. 4 such that, when the cover is closed, the latch bar 42, which has a tapered leading edge, extends through the rectangular aperture 35 of slide 32 and again engages the locking plate 34.

When the armrest is in the position shown in FIG. 1 with the cover latched and is moved toward a vertical position as shown in FIG. 3, the pendulum 60 remains stationary while the arcuate surface 69 of post 68 moves such that the outer arcuate surface 66 of pendulum 60 aligns with the arcuate surface 69 of post 68 as the armrest is moved approximately 15° to 30°. This design allows the corner 65 of the pendulum to engage the post 68 almost immediately, preventing the depression of actuator button 30 and movement of slide 32 integrally attached thereto as the armrest is moved toward a vertical position. Thus, as the armrest is moved upwardly, the pendulum will prevent movement of the slide and unlatching of cover 20 with the interference of the pendulum, with the post being shown in the vertical position as the armrest appears in FIG. 3, as seen in FIG. 5. In this position, the latch plate 34 continuously engages end 44 of latch arm 42, preventing the cover from pivoting to an open position. In some embodiments where less precise locking control is needed, the pendulum and post or rear wall construction can be modified to achieve the desired locking at different angles of elevation of the armrest.

Although the housing 50 is shown in vertical cross section in FIGS. 4 and 5, it is understood that the housing include sidewalls 51 (one shown) which enclose the pendulum assembly, the spring 56 and the slide guide surfaces 52 and 54 thereof. Thus, only a rectangular aperture 35 is exposed through which the latch post 42 extends. Further, the movable elements comprising the pendulum and mounting boss 62 are enclosed in the chamber 70 behind the slide and substantially free from access by debris thereby preventing the locking mechanism from becoming stuck during the life of the use of the armrest.

It is seen, therefore, that the latching mechanism for the present invention provides a relatively inexpensive, reliable and effective mechanism by which the cover of a storage armrest can be latched against opening when the armrest is moved toward a vertical stored position. It will become apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A storage armrest for a vehicle comprising:
    an armrest body defining a storage bin therein and means for mounting said body for pivotal movement relative to a vehicle between a generally horizontal position for use as an armrest and a generally vertical stored position;
    a cover pivotally mounted to said armrest body and defining an upper armrest surface and enclosing a generally rectangular opening for access to said storage bin when the cover is opened; and
    a latch assembly extending between said cover and body, wherein said latch assembly comprises a latch member mounted to one of said cover and body and a slide mounted to the other of said cover and body, wherein said slide includes a latch bar selectively engaging said latch member to hold said cover in a locked position when said slide is in a first position and releasing said latch member when said slide is moved to a second position, and further including a pendulum mounted to said slide for preventing movement of said slide from said first to second position when said armrest body is moved toward a vertical position.

2. The armrest as defined in claim 1 wherein said body includes a housing for slideably receiving said slide, said housing defining an enclosed chamber and wherein said pendulum is pivotally mounted in said chamber for preventing debris from accessing said pendulum.

3. The armrest as defined in claim 1 wherein said slide includes a rear wall and said pendulum is pivotally mounted to said rear wall of said slide, and said latch assembly includes a housing slideably receiving said slide, said housing including a member for engaging said pendulum when said armrest is moved toward a vertical position, preventing movement of said slide.

4. The armrest as defined in claim 3 wherein said pendulum includes an arcuate outer surface and said member comprises a post having an arcuate surface conforming to the curvature of said arcuate surface of said pendulum.

5. A storage armrest for a vehicle comprising:
    an armrest body defining a storage compartment having a generally open upper area for access thereto;

a cover pivotally mounted to said armrest body for enclosing said storage compartment;

a slide mounted to said body of said armrest and including a slot along one edge thereof;

a housing mounted to said body for slidably receiving said slide, said housing including bias means urging said slide toward a locking position;

a locking bar extending from said cover into said slot of said slide for engaging said slide for locking said cover in a closed position; and a pendulum lock mounted between said slide and said housing for preventing movement of said slide when said armrest body is moved toward a vertical position to prevent said locking bar from clearing said slide.

6. A latch assembly for a vehicle storage armrest which includes an armrest body defining a storage bin therein, the body mounted to a vehicle for movement between a generally horizontal position for use as an armrest and a generally vertical stored position and a cover pivotally mounted to said armrest body and defining an upper armrest surface and enclosing a generally rectangular opening for access to said storage bin when the cover is opened, said latch assembly comprising:

a latch member for mounting to one of a cover and body; and a slide for mounting to the other of a cover and body, wherein said slide selectively engages said latch member for holding the cover in a locked position when said slide is in a first position and releasing said latch member when said slide is moved to a second position, and further including a pendulum mounted to said slide for preventing movement of said slide from said first to second position when the body is moved toward a vertical position.

7. The latch assembly as defined in claim 6 and further including a housing slideably receiving said slide, said housing defining an enclosed chamber and said pendulum is pivotally mounted in said chamber for preventing debris from accessing said pendulum.

8. The latch assembly as defined in claim 7 wherein said pendulum includes an arcuate outer surface and said chamber includes a post having an arcuate surface conforming to the curvature of said arcuate surface of said pendulum for selectively engaging said pendulum.

9. A storage armrest for a vehicle comprising:

an armrest body defining a storage bin therein and means for mounting said body for pivotal movement relative to a vehicle between a generally horizontal position for use as an armrest and a generally vertical stored position;

a cover pivotally mounted to said armrest body and defining an upper armrest surface and enclosing a generally rectangular opening for access to said storage bin when the cover is opened;

a housing mounted to said body; and a latch assembly extending between said cover and body, wherein said latch assembly comprises a latch member mounted to said cover and a slide slideably mounted to said housing, wherein said slide selectively engages said latch member to hold said cover in a locked position when said slide is in a first position and releases said latch member when said slide is moved to a second position, and further including a pendulum pivotally mounted to one of said housing and slide including a surface selectively engaging the other of said housing and slide for preventing movement of said slide from said first to second position when said armrest body is moved toward a vertical position.

10. The armrest as defined in claim 9 wherein said housing defines an enclosed chamber and wherein said pendulum is pivotally mounted in said chamber for preventing debris from accessing said pendulum.

11. The armrest as defined in claim 10 wherein said slide includes a rear wall and said pendulum is pivotally mounted to said rear wall of said slide and said housing includes a member for engaging said pendulum when said armrest is moved toward a vertical position, preventing movement of said slide.

12. The armrest as defined in claim 11 wherein said pendulum includes an arcuate outer surface and said member comprises a post having an arcuate surface conforming to the curvature of said arcuate surface of said pendulum.

13. A storage armrest for a vehicle comprising:

an armrest body defining a storage bin, said armrest body adapted for movement between a generally horizontal position for use as an armrest and a generally vertical stored position;

a cover pivotally mounted to said armrest body for selectively enclosing said storage bin; and a pendulum latch assembly extending between said cover and body to hold said cover in a locked closed position when said armrest body is moved toward said vertical position.

14. The armrest as defined in claim 13 wherein said pendulum latch assembly comprises:

a latch member mounted to one of said cover and body; and a slide mounted to the other of said cover and body, wherein said slide selectively engages said latch member to hold said cover in a locked position when said slide is in a first position and releasing said latch member when said slide is moved to a second position, and further including a pendulum mounted to said slide for preventing movement of said slide from said first to second position when said armrest body is moved toward a vertical position.

15. The armrest as defined in claim 14 and further including a housing slideably receiving said slide, said housing defining an enclosed chamber and wherein said pendulum is pivotally mounted in said chamber for preventing debris from accessing said pendulum.

16. The armrest as defined in claim 15 wherein said slide includes a rear wall and said pendulum is pivotally mounted to said rear wall of said slide and said housing includes a member for engaging said pendulum when said armrest is moved toward a vertical position, preventing movement of said slide.

17. The armrest as defined in claim 16 wherein said pendulum includes an arcuate outer surface and said member comprises a post having an arcuate surface conforming to the curvature of said arcuate surface of said pendulum.

\* \* \* \* \*